(12) United States Patent
George et al.

(10) Patent No.: US 10,007,455 B1
(45) Date of Patent: Jun. 26, 2018

(54) AUTOMATED CONFIGURATION OF HOST CONNECTIVITY

(71) Applicant: EMC IP Holding Company LLC, Hopkinton, MA (US)

(72) Inventors: Subin George, Framingham, MA (US); Violet S. Beckett, Sutton, MA (US); Arieh Don, Newton, MA (US); Vinay Rao, Karnataka (IN); Michael Specht, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 15/392,016

(22) Filed: Dec. 28, 2016

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/0689* (2013.01)

(58) Field of Classification Search
None
See application file for complete search history.

(56) References Cited

U.S. PATENT DOCUMENTS 7,962,672 B1    6/2011  Martin et al.
8,301,812 B1 *  10/2012 Riordan .............. G06F 13/4022
                                                        709/225

OTHER PUBLICATIONS

EMC Unisphere for VMAX version 8.0.3 Online Help Rev 01, published Jun. 2015 (Year: 2015).*

* cited by examiner

*Primary Examiner* — Prasith Thammavong
*Assistant Examiner* — Jason W Blust
(74) *Attorney, Agent, or Firm* — Muirhead and Saturnelli, LLC

(57) ABSTRACT

Masking information may be automatically determined for a host after zoning between the host and data storage system is complete. Processing may include the host sending host registration commands from host initiators. From registration information provided with the host registration commands, an initiator group may be determined for the masking view as including the initiators identified as belonging to the host. A port group may be determined as those target ports at which the host registration commands are received. A default storage group with a default device may be created. A masking view for the host may be created that includes the initiator group, the target port group and the default storage group whereby the masking view indicates that the first device is accessible or exposed, through each target port of the target port group, to each initiator of the initiator group.

20 Claims, 7 Drawing Sheets

AUTOMATED CONFIGURATION OF HOST CONNECTIVITY

BACKGROUND

Technical Field

This application generally relates to connectivity between hosts and data storage systems.

Description of Related Art

Data storage systems may include resources used by one or more host systems. Data storage systems and host systems may be interconnected by one or more communication connections such as in a network. These resources may include, for example, data storage devices such as those included in the data storage systems manufactured by EMC Corporation. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of the invention is a method of providing connectivity comprising: receiving, at a data storage system from a host, a first set of one or more host registration commands, wherein each host registration command of the first set is sent from an initiator of the host, is received at a target port of the data storage system, and includes first information uniquely identifying the host as including the initiator that sent said each host registration command; and responsive to said receiving, performing first processing that automatically creates a masking view for the host, said first processing including: determining an initiator group including one or more initiators, wherein each initiator of the initiator group sent a host registration command of the first set; determining a target port group including one or more target ports of the data storage system, wherein each target port of the target port group has received at least one host registration command of the first set sent by an initiator of the initiator group; determining a default storage group including a first device; and creating the masking view for the host, said masking view including the initiator group, the target port group and the default storage group whereby the masking view indicates that the first device is accessible or exposed, through each target port of the target port group, to each initiator of the initiator group. The first information may uniquely identify the host and may include a network address of the host. The first information may include an alphanumeric or alphabetic identifier associated with the network address. The masking view may be associated with an identifier that is alphabetic or alphanumeric and the identifier may be referenced in connection with modifying the masking view. The method may include notifying the host that the first device is a new device exposed over a first target port, wherein the first target port is included in the target port group of the masking view of the host; performing discovery processing by the host to obtain discovery information regarding the first device, said discovery information including second information identifying the data storage system including the first device, wherein the second information includes a data storage system identifier uniquely identifying the data storage system; and determining whether the host has connectivity to an expected data storage system that is uniquely identified by a first identifier, wherein said determining whether the host has connectivity includes verifying that the data storage system identifier matches the first identifier of the expected data storage system. The method may include: receiving, from the host at the first target port of the data storage system, a first command requesting a report of devices exposed through the first target port; and sending, from the data storage system to the host, return information including a notification identifying the first device as a new device exposed through the first target port, and wherein the host performs the discovery processing responsive to receiving the notification of the return information. At least a first host registration command of the first set may be directed to a first target port of the target port group. At least a first host registration command of the first set is received at a first target port of the target port group and the first host registration command is directed to a generic device that is exposed without masking whereby the generic device is accessible to all requesting initiators. The generic device may be exposed through multiple target ports of the data storage system and may be accessible, to any requesting initiator, through the multiple target ports. The generic device may be exposed, to any requesting initiator, through all target ports of the data storage system. A network may be configured to provide connectivity between a plurality of target ports of the data storage system and a plurality of initiators of a plurality of hosts, and the generic device may be a logical device that is accessible, over the plurality of target ports, to the plurality of initiators of the plurality of hosts.

In accordance with another aspect of techniques herein is a system comprising: a processor; and a memory comprising code stored thereon that, when executed, performs a method of providing connectivity comprising: receiving, at a data storage system from a host, a first set of one or more host registration commands, wherein each host registration command of the first set is sent from an initiator of the host, is received at a target port of the data storage system, and includes first information uniquely identifying the host as including the initiator that sent said each host registration command; and responsive to said receiving, performing first processing that automatically creates a masking view for the host, said first processing including: determining an initiator group including one or more initiators, wherein each initiator of the initiator group sent a host registration command of the first set; determining a target port group including one or more target ports of the data storage system, wherein each target port of the target port group has received at least one host registration command of the first set sent by an initiator of the initiator group; determining a default storage group including a first device; and creating the masking view for the host, said masking view including the initiator group, the target port group and the default storage group whereby the masking view indicates that the first device is accessible or exposed, through each target port of the target port group, to each initiator of the initiator group.

In accordance with another aspect of techniques herein is a computer readable medium comprising code stored thereon that, when executed, performs a method of providing connectivity comprising: receiving, at a data storage system from a host, a first set of one or more host registration commands, wherein each host registration command of the first set is sent from an initiator of the host, is received at a target port of the data storage system, and includes first information uniquely identifying the host as including the initiator that sent said each host registration command; and responsive to said receiving, performing first processing that automatically creates a masking view for the host, said first processing including: determining an initiator group including one or more initiators, wherein each initiator of the initiator group sent a host registration command of the first set; determining a target port group including one or more target ports of the data storage system, wherein each target port of the target port group has received at least one host registration command of the first set sent by an initiator of the initiator group; determining a default storage group including a first device; and creating the masking view for the host, said masking view including the initiator group, the target port group and the default storage group whereby the masking view indicates that the first device is accessible or exposed, through each target port of the target port group, to each initiator of the initiator group. The first information may uniquely identify the host and may include a network address of the host. The first information may include an identifier that is any of an alphanumeric and alphabetic, and the identifier may be associated with the network address. The masking view may be associated with the identifier and referenced in connection with modifying the masking view. The method may include: notifying the host that the first device is a new device exposed over a first target port, wherein the first target port is included in the target port group of the masking view of the host; performing discovery processing by the host to obtain discovery information regarding the first device, said discovery information including second information identifying the data storage system including the first device, wherein the second information includes a data storage system identifier uniquely identifying the data storage system; and determining whether the host has connectivity to an expected data storage system that is uniquely identified by a first identifier, wherein said determining whether the host has connectivity includes verifying that the data storage system identifier matches the first identifier of the expected data storage system. The method may include: receiving, from the host at the first target port of the data storage system, a first command requesting a report of devices exposed through the first target port; and sending, from the data storage system to the host, return information including a notification identifying the first device as a new device exposed through the first target port, and wherein the host performs the discovery processing responsive to receiving the notification of the return information. At least a first host registration command of the first set may be directed to a first target port of the target port group. At least a first host registration command of the first set may be received at a first target port of the target port group and the first host registration command may be directed to a generic device that is exposed without masking whereby the generic device is accessible to all requesting initiators.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
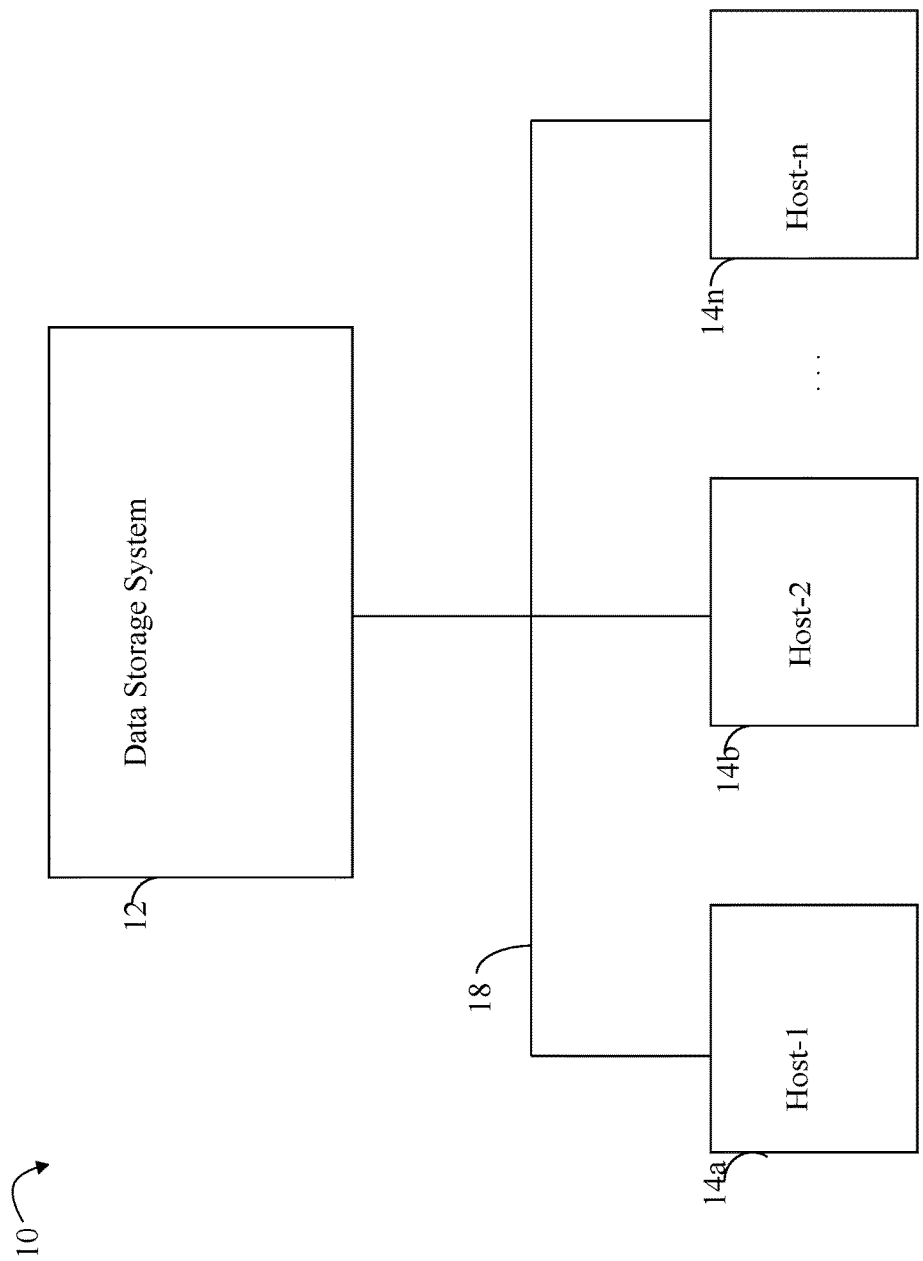
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
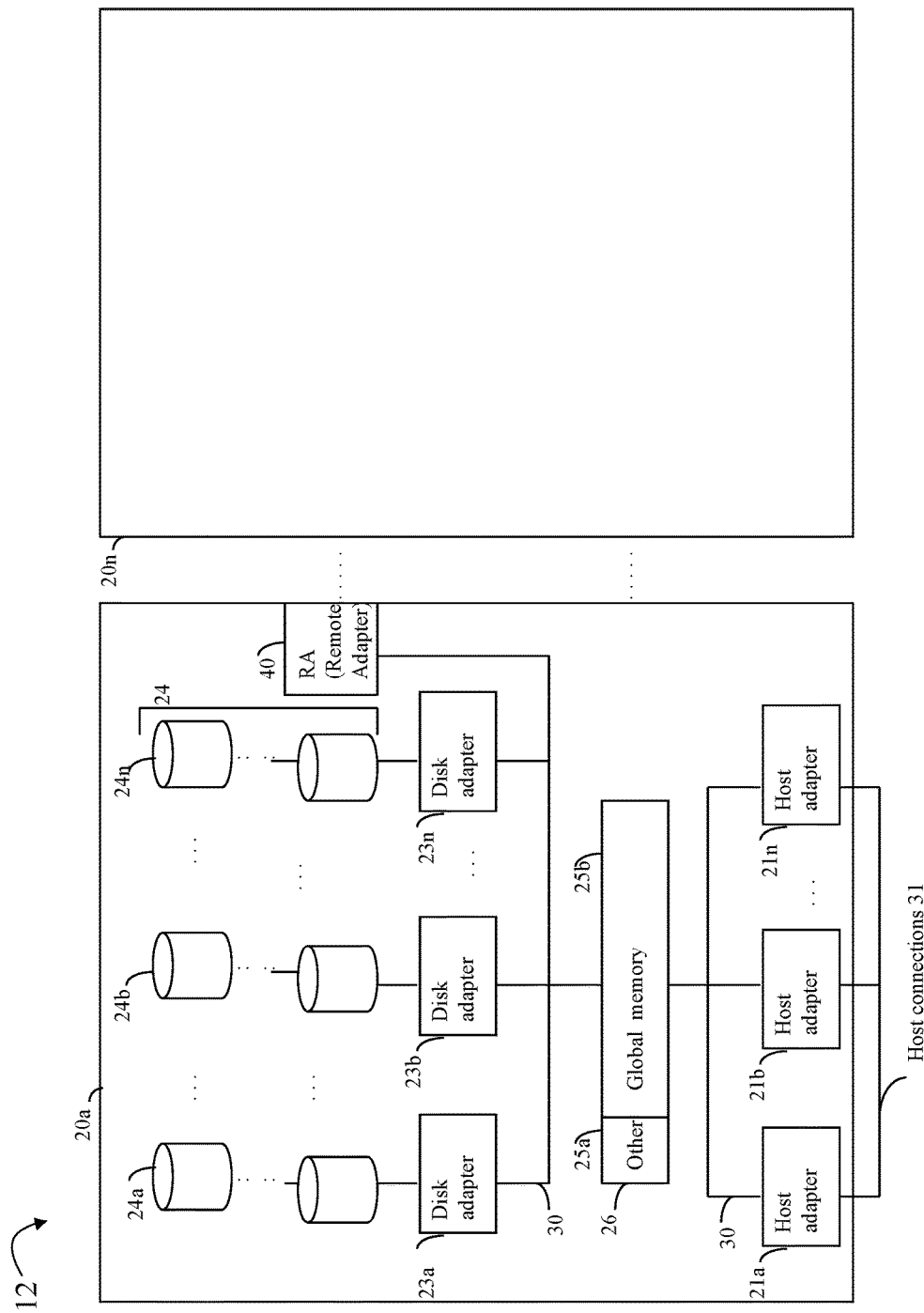
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
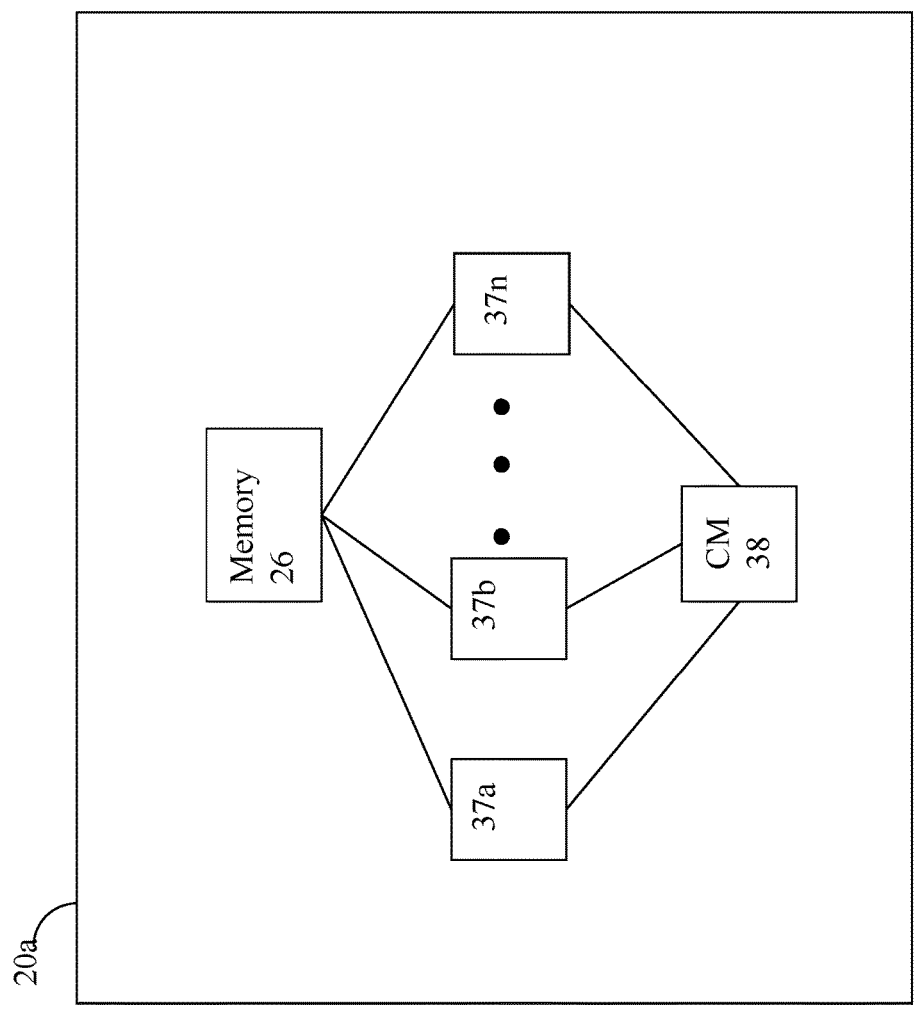
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
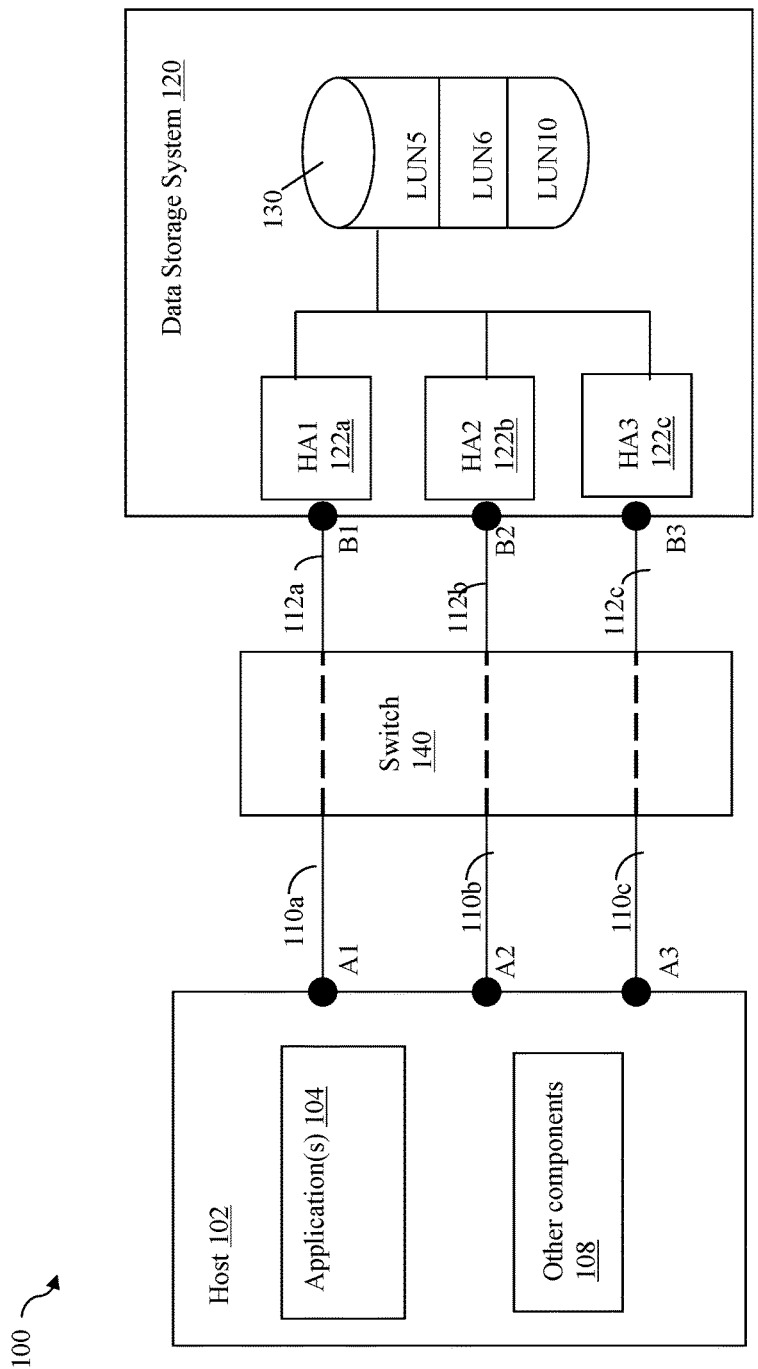
FIG. 3 is an example of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical storage device of the data storage system 120, such as a rotating disk drive, flash-based or other solid state storage device, and the like, where the physical storage device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

It should be noted that following paragraphs and examples may refer to a particular examples using switch 140 having a switching fabric for simplicity of illustration, element 140 may be a single switch having a switching fabric, a multi-switch having a multi-switch fabric and the like. Thus, element 140 may more generally denote a network having its own connectivity fabric or network fabric where the network may include one or more components providing the connectivity between the host 102 and data storage system 120.

The host 102 may include one or more applications 104 and other components 108 whereby element 108 may include, for example, one or more other device drivers and other code. An I/O operation from the application 104 may be communicated to the data storage system 120 using one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over one or more physical paths. As such, each of the I/O operations may be forwarded from the application 104 to the data storage system 120 over one of the possible multiple paths.

The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
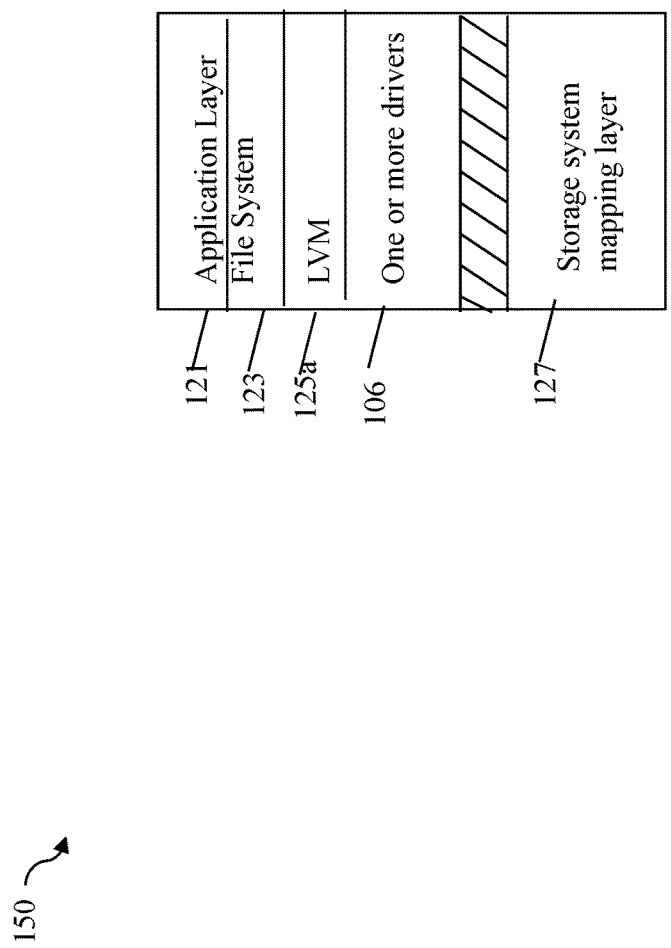
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with performing a data operation request issued by a host to a data storage system such as illustrated in FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be one or more drivers 106 which handle processing of the I/O received from layer 125a. The one or more drivers represented by 106 may include, for example, a SCSI driver (e.g., performs processing for sending requests and receiving responses in accordance with the SCSI standard), a hardware driver (e.g., a driver for an HBA of the host which sends commands or requests to the data storage system and also receives responses and other communications from the data storage system), a multiple path I/O (MPIO) driver, and the like. Generally, one or more layers between the application layer 121 and the one or more drivers 106 may provide for mapping a LUN (such as used in connection with block-based storage) presented by the data storage system to the host to another logical data storage entity, such as a file, that may be used by the application layer 121.

In at least one embodiment when an I/O operation may be sent to a LUN over one of multiple paths, the MPIO driver may provide for automatically selecting one of the multiple paths over which to send the I/O. The MPIO driver may thus provide for selection of a path whereby such selection is transparent to the issuing application layer 121. The MPIO driver may use any suitable technique in connection with path selection. In this manner, the MPIO driver may, for example, perform load balancing among the multiple paths, automatically use an alternative path in the event a particular path is unavailable for sending the I/O to the LUN, and the like.

In some embodiments, the data storage system 120 of FIG. 3 may be an intelligent data storage system having its own mapping layer 127 such that the LUN known or exposed to the host may not directly correspond to a physical device such as a disk drive. In such embodiments, the LUN specified by the host in the command associated with the I/O operation may be further mapped by the data storage system using its mapping layer 127. For example, a LUN specified by the host may be mapped by the data storage system to one or more physical drives, multiple LUNs may be located on a same physical device, multiple physical drives, and the like. In other embodiments, the data storage system may not include such a mapping layer 127.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the drivers 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations with respect to data stored on a LUN.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port (also referred to herein as a target port) of an HA (e.g., such as B1-B3 of FIG. 3) in the data storage system. Over each such path, one or more LUNs may be visible or exposed to the host initiator through the target port of the data storage system.

In at least one embodiment in accordance with techniques herein, zoning may be used in combination with masking. Generally, zoning specifies connectivity between the host and data storage system and masking may be used to further control or limit access to particular LUNs.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information, LUN mask information or masking views (MVs)) provides the HAs and their target ports information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

In at least one embodiment in accordance with techniques herein and with reference back to FIG. 3, zoning may be performed with respect to the switch 140, or more generally, network fabric or switching fabric, whereby connectivity between the host 102 and data storage system 120 is specified. In a SAN, zoning may be performed for selectively allowing access to data only to certain users. Essentially, zoning allows an administrator to control who (e.g., which initiator(s)) can see what target ports in a SAN. Using zoning in combination with LUN masking as described herein provides control over who (e.g., what initiator(s)) can see what data/devices (e.g., LUNs) over which target ports in a SAN. Zoning is generally known in the art. Zones may be created by grouping world wide port names (WWPNs) of host interfaces (e.g., initiators) and data storage system interfaces (e.g., target ports) into zones. The set of zones created may be placed into a zone set which is then activated on the fabric, such as the switching fabric to define the logical connections between host initiators and target ports of the data storage system. Zoning may be performed by issuing requests or commands to the switch. For example, with reference back to FIG. 3, a host initiator may be host port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protocol) and can perform processing to discover the zoning changes and log into the switch to establish any new connections.

Thus, zoning may be generally characterized as defining logical connections providing connectivity between the various host initiators and target ports. Existing connectivity including a set of logical connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric.

In an embodiment in accordance with techniques herein using zoning and masking, zoning of switch 140 may be performed to define the connectivity between the host 102 and data storage system 120 through the switch 140. Masking may then be used by the data storage system to further control which LUNs of the data storage system 120 are exposed, accessible or visible, through which of the target ports B1-B3, to each of the initiators 110a-c of the host 102.

In some existing systems, after zoning of the switch is performed to define the connectivity between the host and data storage system, specifying masking information may be performed manually. As described elsewhere herein, masking information specifies which initiators have access to which LUNs over which target ports of the data storage system 120. The masking information identifying which initiators of a host have access to which LUNs on which target ports may be entered using data storage management software used to manage the data storage system. For example, such masking information may be entered manually by a user via a defined management interface such as a GUI, CLI, and the like, as may be supported in an embodiment.

Described in following paragraphs are techniques that may be used to automatically define and create masking views specifying masking information. Such techniques may be performed automatically after zoning of the switch (e.g., switching or network fabric) is performed to define connectivity between the host and data storage system. In at least one embodiment, a masking view (MV) may be created for each host. Each MV specified for a host may identify what LUNs are accessible to which initiators of the host over which of the target ports of the data storage system. Thus, each instance of an MV associated with a particular host may include a port group (PG), an initiator group (IG), and a device group or storage group (SG). The PG may identify one or more target ports of the data storage system. The IG may identify one or more initiators of the host associated with the MV instance. The SG may identify one or more LUNs. In this manner, the MV associated with a host may denote that the LUNs of the SG are accessible to the initiators (of the host) of the IG over target ports of the PG.

In one embodiment, each initiator and each target port of the data storage system may have an associated WWPN and the masking information identifies which initiator WWPNs are allowed to access particular LUNs on each target port WWPN of the data storage system. In the MV for a host, the IG may identify the WWPNs of host initiators and the PG may identify the WWPNs of target ports of the data storage system.

In at least one embodiment in accordance with techniques herein, each host may be uniquely identified using a network address of the host, such as an IP address. Furthermore, each host may have an associated HOST NAME which is mapped or aliased to the host's unique network address. The HOST NAME may be a user-readable name, such as an alphabetic or alphanumeric identifier providing an easier way for a human to reference or identify a particular host. In such an embodiment, the MV for a particular host may be associated with, or mapped to, the host's network address and also the host's HOST NAME. In this way, the MV of a host may be indexed and accessed using the host's network address. Further, assuming the HOST NAME also provides for uniquely identifying the host, the MV of a host may be indexed and accessed using the HOST NAME. In embodiment may therefore provide access to a host's MV through the host's HOST NAME and/or the host's network address.

Figure 5:
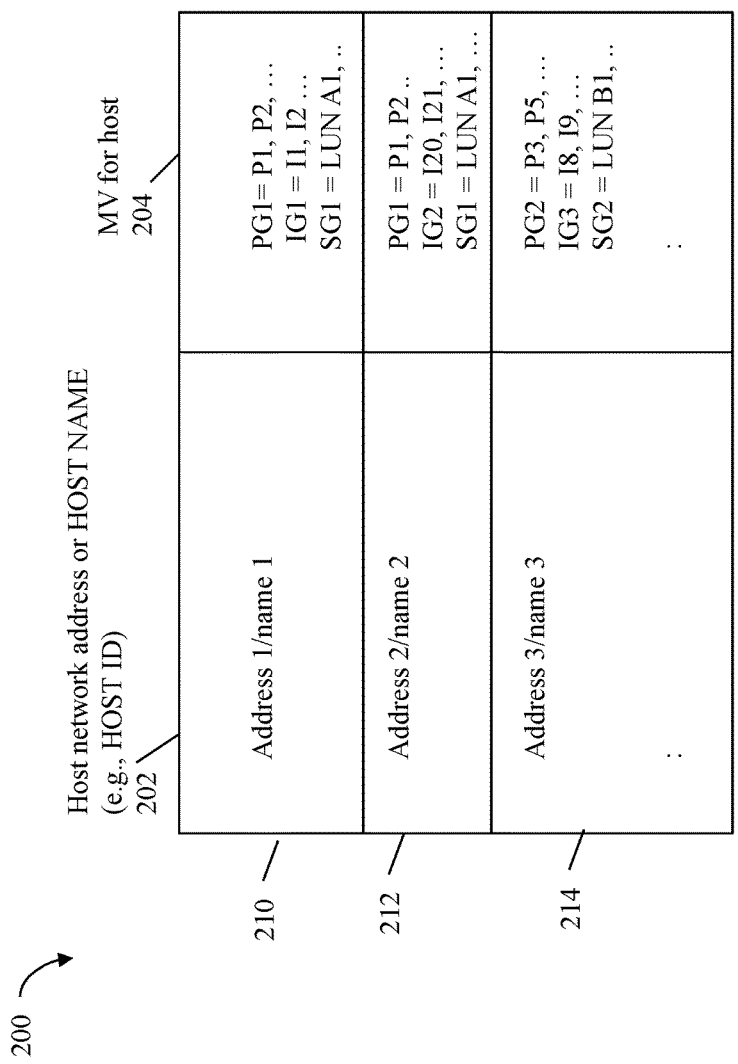
FIG. 5 is an example of masking information that may be created and used in an embodiment in accordance with techniques herein.

Referring to FIG. 5, shown is an example of masking information that may be created and used in an embodiment in accordance with techniques herein. In the example 200, shown is a table of MVs for a plurality of hosts. Each row of the table denotes an MV instance in column 204 configured for a particular host identified in column 202 of the same row. The table 200 may index or provide access to MVs using the host's unique network address or the host's unique HOST NAME as described elsewhere herein. For example, consider an embodiment in which the table 200 is indexed and accessed by host network address in column 202. Generally, the example 200 uses the notation PGn, n being an integer greater than 0, to identify an instance of a PG; uses the notation IGn to identify and instance of an IG; and uses the notation SGn to identify an instance of a SG. In a PG, Pn may denote a target port WWPN. In an IG, In may denote an initiator WWPN.

Row 210 may denote a first host having a network address of Address 1 (as in column 202 of row 210) with an MV as specified in column 204 of row 210. As illustrated in column 204 of row 210, the first host has a first MV including port group PG1, initiator group IG1, and storage group SG1. Row 212 may denote a second host having a network address of Address 2 (as in column 202 of row 212) with an MV as specified in column 204 of row 212. As illustrated in column 204 of row 212, the second host has a second MV including port group PG1, initiator group IG2, and storage group SG1. Note that SGs and PGs may be defined and reused in different MV instances for different hosts. For example, PG1 may be defined as a set of target ports of the data storage system and SG1 may be defined as a set of particular LUNs where both PG1 and SG1 are used in the MVs of rows 210 and 210. Row 214 may denote a third host having a network address of Address 2 (as in column 202 of row 214) with an MV as specified in column 204 of row 214.

As illustrated in column 204 of row 214, the third host has a third MV including port group PG2, initiator group IG3, and storage group SG2.

In following paragraphs, each host's network address or HOST NAME denoted in column 202 that uniquely identifies a particular host may be referred to more generally as a HOST ID that uniquely identifies the particular host.

Described below are techniques that may be used to initially and automatically create masking information as included in the MVs for hosts where such MVs may be used to initially populate table 200 of FIG. 5. At a later point in time, a user or customer may modify the masking information in table 200 of FIG. 5.

In an embodiment in accordance with techniques herein with reference back to FIG. 3, the network and illustrated components may be in the process of initializing and starting up whereby the zoning has completed and the host may be in the process of performing its initialization processing. Once zoning of the switch 140 is complete whereby the host 102 has connectivity defined by such zoning to the data storage system 120, the host 102 (as part of its initialization) may send host registration commands to the data storage system 120. More specifically, the host 102 may send a host registration command on each path or unique combination of initiator (e.g., host HBA) and target port. For example, assume that connectivity has been zoned in the switch 140 for paths between each unique pair of initiator and target port or 9 paths as follows: A1-B1, A1-B2, A1-B3, A2-B1, A2-B2, A2-B3, A3-B1, A3-B2, and A3- B3. The host 102 (e.g., the MPIO driver of the host 102) may send a host registration command from the host 102 to the data storage system 120 over each of the foregoing 9 paths to register the host on each of the target ports B1, B2, B3 of the data storage system. In at least one embodiment, the host registration command may be a SCSI command directed to a target port of the data storage system. It should be noted that the host registration command may be directed to a target port of the data storage system rather than a LUN because, at this point in system startup, no LUNs may be defined or have storage provisioned on the data storage system.

Each registration command sent from an initiator HBA port of the host 102 includes registration information including the HOST ID uniquely identifying the particular host that sent the registration command. Additionally, the data storage system 120 receiving the host registration command knows the WWPN of the initiator which sent the registration command. In at least one embodiment, the receiving target port of the data storage system may be provided the WWPN of the sending host initiator as part of information transmitted with the registration command. An embodiment in accordance with techniques herein may automatically and programmatically (e.g., by executing code) may define the IG for the MV for host 102 using the registration information transmitted with the host registration commands and knowing the WWPNs of the host initiators that sent the host registration commands. More specifically, processing may be performed on the data storage system 120 to process the registration information received with host registration commands to form an IG for the host 102 having the HOST ID. For each host registration command received from an initiator, where the registration information of the command identifies HOST ID as the sending host including the initiator, that initiator may be included in the IG for the host 102. In this manner, processing may be performed, such as on the data storage system, to automatically form sets of IGs by grouping and associating initiator WWPNs having a common or the same HOST ID.

At this point, the IG for host 102 may be automatically formed as described above and associated with the HOST ID of the host 102. Additionally, processing may also be automatically performed to define a PG for host 102 and its associated IG where the PG includes the one or more target ports of the data storage system which received one of the host registration commands from an initiator of the IG. For example, as noted above with reference back to FIG. 3, 9 host registration commands may sent from the host 102 to the data storage system 120. The IG for MV of host 102 may include A1, A2 and A3 since each of these initiators sent 3 host registration commands to each of the 3 target ports B1, B2 and B3, and registration information of such commands identified the same HOST ID (uniquely identifying host 102) as the host including the initiators that sent the commands. The PG for the MV of host 102 may be the set of target ports of the data storage system that received a host registration command sent by one of the initiators in the IG for host 102. In this example, the 3 target ports B1, B2, and B3 form the PG for host 102.

In at least one embodiment in accordance with techniques herein such as described above in connection with FIG. 3, each initiator of host 102 may be zoned to use the same set of target ports B1, B2 and B3. However, it may be that not all initiators of the IG for the host actually register with, or issue host registration commands to, the same set of target ports of the data storage system. In this latter case, even if not all initiators of the IG do not actually register on the same set of target ports, the PG may be formed as the set which is the union of all target ports that receive a registration command from an initiator of the IG. Note that in such a case, if a particular target port of the PG is not zoned for a particular initiator, then the particular initiator will be restricted and only allowed to send commands to its zoned target ports.

At this point, an MV may be defined for the host 102 where the MV includes the IG and PG formed as described above based on the host registration commands received on the data storage system. At this point, LUNs have not yet been created in the data storage system and therefore SGs have also not yet been defined by the customer (e.g. since the system and network are in the initialization or startup processing phase). At a later point in time, the LUNs may be created and SGs may be defined by the customer. However, it may be desirable to provide the host 102 with confirmation regarding creation of the IG and PG for the host's MV. In an embodiment in accordance with techniques herein, processing may be performed to automatically create a default SG for the host's MV where the default SG includes a single LUN. The single LUN may be characterized as a default LUN automatically created for the sole purposes of providing the host 102 with confirmation that the MV for the host 102 has been properly created (e.g., PG and IG of the host's MV are correct/have been correctly derived from the received host registration commands sent by host 102 as described above), and that the host has its expected/properly zoned switch connectivity. The default LUN may be, for example, created with a very small or minimum capacity and may serve as a placeholder in the SG for confirmation regarding successful and proper creation of the MV for host 102. In at least one embodiment, a different default LUN and different default SG may be created for each host MV automatically created using techniques herein.

Once the default LUN has been created and the default SG has been defined to include the default LUN, the MV for host 102 may be created and may include the PG and IG automatically formed using the received host registration commands as described above, and may also include the default SG.

What will now be described is how the host 102 may be provided with confirmation regarding proper creation of its MV. The host 102 may be notified regarding any new LUN exposed or accessible on a target port of the data storage system. In this manner, exposure or accessibility of the default LUN as such a new LUN may be recognized by the host 102 that its MV has been automatically created and is operational. Furthermore, the host 102 may verify that the default LUN is accessible or exposed to all expected initiators over all expected target ports of the data storage system. In at least one embodiment, notification to the host regarding exposure/access to a new LUN through one or more target ports of the data storage system may be provided using suitable SCSI commands and responses as will now be described.

In a first step, the host (e.g., MPIO driver of the host) may poll the data storage system regarding what LUNs are exposed (e.g., visible or accessible) through a particular target port using a first command, a report LUN command. Such polling may be performed by the host, for example, at defined time intervals, upon the occurrence of particular events, and the like. The report LUN command may be issued or directed to each of the target ports and may request a list of the LUNs exposed through the target port (that received the report LUN command). Information returned to the host may include a check condition identifying the newly exposed LUN, which in this example, is the default LUN of the default SG included in the host's MV automatically created using techniques herein.

As a second step performed responsive to receiving the check condition regarding the newly exposed default LUN, the host (e.g., MPIO driver of the host) may then issue one or more other commands as part of discovery processing to discover information about the newly exposed default LUN. One such command directed to the default LUN may be the INQUIRY 8B (hexadecimal) which returns information including the serial number of the data storage system (DS) containing the newly exposed default LUN. The host may use the foregoing returned DS serial number to confirm or verify that the host has connectivity to the expected DS. For example, the host may perform processing to ensure that the DS serial number received in response to the above-noted INQUIRY command matches an expected DS serial number of an expected DS. In this manner, the host may verify that the connectivity provided to the default LUN by the MV is to the correct or expected data storage system whereby the host has been properly zoned to the correct data storage system. Additionally, the host may thoroughly confirm that the switch zoning and the host's MV have been properly configured, for example, by verifying that the host, through its initiators, can access the default LUN over an expected set of target ports.

Thus, processing may be performed as described above to automatically create an MV for each host as part of initialization processing. At a later point in time, the user/customer may modify the MV. For example, after the customer has provisioned LUNs, the SG of the MV may be modified to remove the default LUN and add one or more LUNs provisioned by the customer. As another example, the customer may modify the MV initially created using techniques herein by modifying the PG or IG of the host's MV. Modifications to MVs created using techniques herein may be performed using management software. The MVs, such as those included in the table 200 of FIG. 5, may be created automatically using techniques herein. The MVs may be stored in a database or other data container used by the management software. Subsequently, the management software may be used to modify the MVs by accordingly updating appropriate entries or rows of the table 200 of FIG. 5. In connection with performing such MV modification in at least one embodiment, a user may identify the MV instance of a particular host by referencing the HOST NAME of the host. The foregoing may be a more user-friendly way to reference a particular MV (e.g., use the HOST NAME, that is a text or alphanumeric identifier, rather than a IP address denoting the host's network address). As a further example, a user may create a new SG and associate the new SG with the HOST NAME. Processing may be performed to match the HOST NAME of the new SG with an existing HOST NAME currently associated with an existing MV whereby the new SG may be included in the MV through such matching.

As described above in connection with sending host registration commands, processing is described herein such host registration commands may be directed to target ports of the data storage system rather than a LUN. As a variation, an embodiment in accordance with techniques herein may provision a generic LUN exposed on all the target ports of the data storage system with no masking (e.g. generic LUN is unmasked). In this manner, in at least one embodiment, the generic LUN may be exposed or accessible over all target ports of the data storage system to all hosts (e.g., all initiators of all hosts which are zoned to such target ports). In such an embodiment, the host registration commands may be directed to the generic LUN exposed with no masking. It should be noted that the generic LUN may be a single LUN exposed over all zoned target ports to all zoned host initiators. Thus, the generic LUN may be distinct from the default LUN described above. In at least one embodiment, a different default LUN may be created for each default SG, and a different default SG may be included in each MV created, using techniques herein, for a different host.

Figure 6:
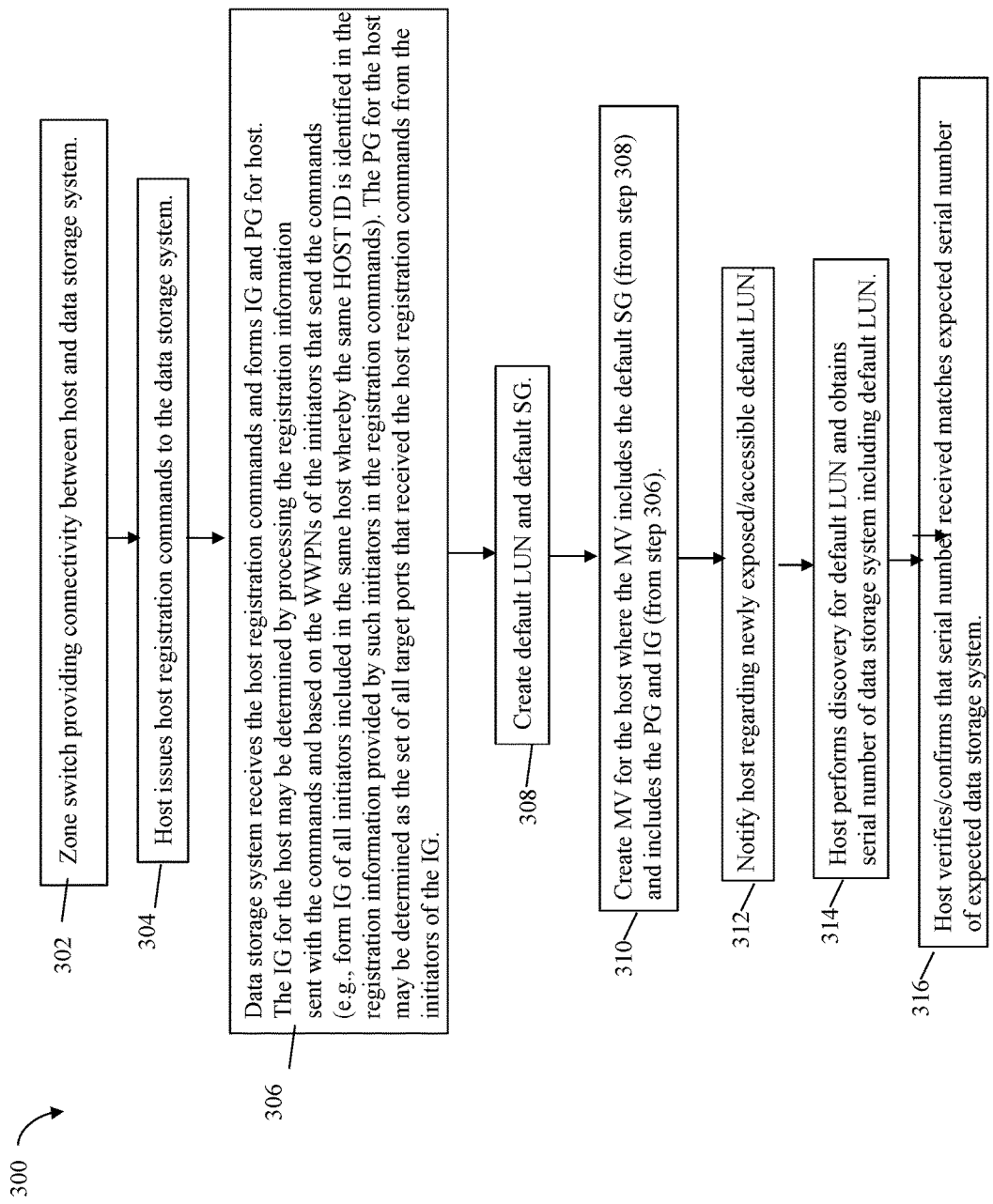
FIG. 6 is a flowchart of processing steps that may be performed in an embodiment in accordance with techniques herein.

Referring to FIG. 6, shown is a flowchart of processing steps that may be performed in an embodiment in accordance with techniques herein. The flowchart 300 summarizes processing described above. At step 302, the switch may be zoned providing connectivity between a host and data storage system. At step 304, the host issues host registration commands to the data storage system. At step 306, the data storage system receives the host registration commands from the host and forms the IG and PG for the host. The IG for the host may be determined by processing the registration information sent with the host registration commands and based on the WWPNs of the initiators that sent such commands (e.g., form IG of all initiators included in the same host whereby the same HOST ID is identified in the registration information provided, by such initiators, in the registration commands sent by the initiators). The PG for the host may be determined as the set of all target ports that received the host registration commands from the initiators of the IG. At step 308, the default LUN may be created and a default SG may be created which includes the default LUN. At step 310, the MV for the host may be created where the MV includes the default SG (from step 308) and includes the PG and IG (from step 306). At this point the default LUN is now exposed/accessible over all target ports of the PG to all initiators of the IG. At step 312, the host is notified regarding the newly exposed/accessible default LUN. By such notification, the host has confirmation that an MV has been created for the host on the data storage system and that zoning of the switch provides connectivity to the data storage system However, at this point, the host has not yet verified that such connectivity is to the correct or expected data storage system. This is performed in following steps 314 and 316. At step 314, the host performs discovery processing for the default LUN and obtains the serial number of the data storage system including default LUN. At step 316, the host verifies or confirms that serial number received (in step 314) matches an expected serial number of the expected or correct data storage system.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of providing connectivity comprising:
receiving, at a data storage system from a host, a first set of one or more host registration commands, wherein each host registration command of the first set is sent from an initiator of the host, is received at a target port of the data storage system, and includes first information uniquely identifying the host as including the initiator that sent said each host registration command; and
responsive to said receiving, performing first processing that automatically creates a masking view for the host, said first processing including:
determining an initiator group including one or more initiators, wherein each initiator of the initiator group sent a host registration command of the first set;
determining a target port group including one or more target ports of the data storage system, wherein each target port of the target port group has received at least one host registration command of the first set sent by an initiator of the initiator group;
determining a default storage group including a first device; and
creating the masking view for the host, said masking view including the initiator group, the target port group and the default storage group whereby the masking view indicates that the first device is accessible or exposed, through each target port of the target port group, to each initiator of the initiator group.

2. The method of claim 1, wherein the first information uniquely identifying the host includes a network address of the host.

3. The method of claim 2, wherein the first information includes an identifier that is any of alphanumeric and alphabetic, and wherein the identifier is associated with the network address.

4. The method of claim 3, wherein the masking view is associated with the identifier and referenced in connection with modifying the masking view.

5. The method of claim 1, further comprising:
notifying the host that the first device is a new device exposed over a first target port, wherein the first target port is included in the target port group of the masking view of the host;

performing discovery processing by the host to obtain discovery information regarding the first device, said discovery information including second information identifying the data storage system including the first device, wherein the second information includes a data storage system identifier uniquely identifying the data storage system; and determining whether the host has connectivity to an expected data storage system that is uniquely identified by a first identifier, wherein said determining whether the host has connectivity includes verifying that the data storage system identifier matches the first identifier of the expected data storage system.

6. The method of claim 5, further comprising:

receiving, from the host at the first target port of the data storage system, a first command requesting a report of devices exposed through the first target port; and sending, from the data storage system to the host, return information including a notification identifying the first device as a new device exposed through the first target port, and wherein the host performs the discovery processing responsive to receiving the notification of the return information.

7. The method of claim 1, wherein at least a first host registration command of the first set is directed to a first target port of the target port group.

8. The method of claim 1, wherein at least a first host registration command of the first set is received at a first target port of the target port group and the first host registration command is directed to a generic device that is exposed without masking whereby the generic device is accessible to all requesting initiators.

9. The method of claim 8, wherein the generic device is exposed through multiple target ports of the data storage system and accessible, to any requesting initiator, through the multiple target ports.

10. The method of claim 9, wherein the generic device is exposed, to any requesting initiator, through all target ports of the data storage system.

11. The method of claim 8, wherein a network is configured to provide connectivity between a plurality of target ports of the data storage system and a plurality of initiators of a plurality of hosts, and wherein the generic device is a logical device that is accessible, over the plurality of target ports, to the plurality of initiators of the plurality of hosts.

12. A system comprising:

a processor; and a memory comprising code stored thereon that, when executed, performs a method of providing connectivity comprising:

receiving, at a data storage system from a host, a first set of one or more host registration commands, wherein each host registration command of the first set is sent from an initiator of the host, is received at a target port of the data storage system, and includes first information uniquely identifying the host as including the initiator that sent said each host registration command; and responsive to said receiving, performing first processing that automatically creates a masking view for the host, said first processing including:

determining an initiator group including one or more initiators, wherein each initiator of the initiator group sent a host registration command of the first set;

determining a target port group including one or more target ports of the data storage system, wherein each target port of the target port group has received at least one host registration command of the first set sent by an initiator of the initiator group;

determining a default storage group including a first device; and creating the masking view for the host, said masking view including the initiator group, the target port group and the default storage group whereby the masking view indicates that the first device is accessible or exposed, through each target port of the target port group, to each initiator of the initiator group.

13. A non-transitory computer readable medium comprising code stored thereon that, when executed, performs a method of providing connectivity comprising:

receiving, at a data storage system from a host, a first set of one or more host registration commands, wherein each host registration command of the first set is sent from an initiator of the host, is received at a target port of the data storage system, and includes first information uniquely identifying the host as including the initiator that sent said each host registration command; and responsive to said receiving, performing first processing that automatically creates a masking view for the host, said first processing including:

determining an initiator group including one or more initiators, wherein each initiator of the initiator group sent a host registration command of the first set;

determining a target port group including one or more target ports of the data storage system, wherein each target port of the target port group has received at least one host registration command of the first set sent by an initiator of the initiator group;

determining a default storage group including a first device; and creating the masking view for the host, said masking view including the initiator group, the target port group and the default storage group whereby the masking view indicates that the first device is accessible or exposed, through each target port of the target port group, to each initiator of the initiator group.

14. The non-transitory computer readable medium of claim 13, wherein the first information uniquely identifying the host includes a network address of the host.

15. The non-transitory computer readable medium of claim 14, wherein the first information includes an identifier that is any of an alphanumeric and alphabetic, wherein the identifier is associated with the network address.

16. The non-transitory computer readable medium of claim 15, wherein the masking view is associated with the identifier and referenced in connection with modifying the masking view.

17. The non-transitory computer readable medium of claim 13, wherein the method further comprises:

notifying the host that the first device is a new device exposed over a first target port, wherein the first target port is included in the target port group of the masking view of the host;

performing discovery processing by the host to obtain discovery information regarding the first device, said discovery information including second information identifying the data storage system including the first device, wherein the second information includes a data storage system identifier uniquely identifying the data storage system; and determining whether the host has connectivity to an expected data storage system that is uniquely identified by a first identifier, wherein said determining whether the host has connectivity includes verifying that the data storage system identifier matches the first identifier of the expected data storage system.

18. The non-transitory computer readable medium of claim 17, wherein the method further comprises:

receiving, from the host at the first target port of the data storage system, a first command requesting a report of devices exposed through the first target port; and sending, from the data storage system to the host, return information including a notification identifying the first device as a new device exposed through the first target port, and wherein the host performs the discovery processing responsive to receiving the notification of the return information.

19. The non-transitory computer readable medium of claim 13, wherein at least a first host registration command of the first set is directed to a first target port of the target port group.

20. The non-transitory computer readable medium of claim 13, wherein at least a first host registration command of the first set is received at a first target port of the target port group and the first host registration command is directed to a generic device that is exposed without masking whereby the generic device is accessible to all requesting initiators.

* * * * *